(12) United States Patent
Chen et al.

(10) Patent No.: US 9,180,393 B2
(45) Date of Patent: *Nov. 10, 2015

(54) LIQUID FILTRATION MEDIA

(75) Inventors: Guanghui Chen, Glen Allen, VA (US);
Henricus Jacobus Cornelis Gommeren, Hockessin, DE (US);
Lawrence Mark Knorr, Midlothian, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 983 days.

This patent is subject to a terminal disclaimer.

(21) Appl. No.: 12/940,312

(22) Filed: Nov. 5, 2010

(65) Prior Publication Data

US 2011/0042316 A1 Feb. 24, 2011

Related U.S. Application Data

(63) Continuation of application No. 12/284,027, filed on Sep. 18, 2008, now Pat. No. 7,993,523, and a continuation-in-part of application No. 12/074,164, filed on Feb. 29, 2008, now Pat. No. 8,038,013.

(60) Provisional application No. 60/905,283, filed on Mar. 6, 2007.

(51) Int. Cl.
| *B01D 61/00* | (2006.01) |
| *B01D 39/00* | (2006.01) |
| *B01D 29/46* | (2006.01) |
| *B01D 24/00* | (2006.01) |
| *B01D 39/16* | (2006.01) |
| *B01D 61/14* | (2006.01) |
| *B01D 61/16* | (2006.01) |
| *B01D 61/18* | (2006.01) |
| *B01D 69/12* | (2006.01) |
| *D04H 1/42* | (2012.01) |

(52) U.S. Cl.
CPC .......... *B01D 39/1623* (2013.01); *B01D 61/147* (2013.01); *B01D 61/16* (2013.01); *B01D 61/18* (2013.01); *B01D 69/12* (2013.01); *D04H 1/42* (2013.01); *B01D 2239/025* (2013.01); *B01D 2239/065* (2013.01)

(58) Field of Classification Search
CPC ............... B01D 2239/025; B01D 39/1623; B01D 2311/04; B01D 46/546; B01D 2311/2649; B01D 2239/0668; B01D 46/543; B01D 69/12; B01D 46/02; B01D 61/147; B01D 61/16; B01D 2239/0631; B01D 2323/39
USPC ......... 210/483, 488, 489, 490, 493.3, 500.36, 210/321.6, 500.8; 55/385.3; 95/78; 119/51.01, 51.5, 174

See application file for complete search history.

(56) References Cited

U.S. PATENT DOCUMENTS

| 425,189 | A | | 4/1890 | Shaw |
| 4,104,394 | A | | 8/1978 | Okita |
| 4,125,706 | A | * | 11/1978 | Umezawa et al. ........... 536/13.5 |
| 4,127,706 | A | | 11/1978 | Martin et al. |
| 4,350,655 | A | | 9/1982 | Hoge |
| 4,472,328 | A | | 9/1984 | Sugimoto et al. |
| 4,596,837 | A | | 6/1986 | Yamamoto et al. |
| 4,650,506 | A | * | 3/1987 | Barris et al. .................... 55/487 |
| 4,720,292 | A | | 1/1988 | Engel et al. |
| 4,777,073 | A | | 10/1988 | Sheth |
| 4,933,060 | A | | 6/1990 | Prohaska et al. |
| 4,949,284 | A | | 8/1990 | Watanabe |
| 5,047,287 | A | | 9/1991 | Horiuchi et al. |
| 5,082,476 | A | | 1/1992 | Kahlbaugh et al. |
| 5,098,625 | A | | 3/1992 | Huange et al. |
| 5,104,537 | A | | 4/1992 | Stifelman et al. |
| 5,167,890 | A | | 12/1992 | Sasshofer et al. |
| 5,170,011 | A | | 12/1992 | Martucci |
| 5,225,131 | A | | 7/1993 | Tamaru et al. |
| 5,234,739 | A | | 8/1993 | Tanaru et al. |
| 5,234,751 | A | | 8/1993 | Harada et al. |
| 5,271,666 | A | | 12/1993 | Okubo |
| 5,298,165 | A | | 3/1994 | Oka et al. |
| 5,433,859 | A | | 7/1995 | Degen |
| 5,501,795 | A | | 3/1996 | Pall et al. |
| 5,613,992 | A | | 3/1997 | Engel |
| 5,707,526 | A | | 1/1998 | Kraus et al. |
| 5,820,646 | A | | 10/1998 | Gillingham et al. |
| 5,853,442 | A | | 12/1998 | Glen et al. |

(Continued)

FOREIGN PATENT DOCUMENTS

| EP | 0185590 | 12/1985 |
| EP | 0523644 | 7/1992 |

(Continued)

OTHER PUBLICATIONS

Philip A. Schweitzer; Handbook of Separation Techniques for Chemical Engineers, Mc Graw Hill, 1979.*

(Continued)

*Primary Examiner* — Ana Fortuna

(57) ABSTRACT

A liquid filter with a composite medium that has a nanoweb adjacent to and optionally bonded to a microporous membrane. The membrane is characterized by an LRV value of 3.7 at a rated particle size, and the nanoweb has a fractional filtration efficiency of greater than 0.1 at the rated particle size of the membrane. The nanoweb also has a thickness efficiency ratio of greater than 0.0002 at that efficiency. The nanoweb acts to provide depth filtration to the membrane, prefilters particles and extends the lifetime of the membrane.

27 Claims, No Drawings

(56) References Cited

U.S. PATENT DOCUMENTS

| | | | |
|---|---|---|---|
| 5,855,977 | A | 1/1999 | Fukushi et al. |
| 5,954,849 | A | 9/1999 | Berkhoel et al. |
| 6,149,702 | A | 11/2000 | Kawano et al. |
| 6,168,718 | B1 | 1/2001 | Sutter et al. |
| 6,869,682 | B2 | 3/2005 | Jing |
| 6,875,249 | B2 * | 4/2005 | Gogins ............... 55/385.3 |
| 6,962,754 | B2 | 11/2005 | Bussi et al. |
| 7,008,465 | B2 * | 3/2006 | Graham et al. ............ 95/78 |
| 7,115,150 | B2 * | 10/2006 | Johnson et al. ............ 55/486 |
| 7,441,667 | B2 * | 10/2008 | Galvin et al. ............. 210/507 |
| 7,993,523 | B2 * | 8/2011 | Chen et al. .............. 210/650 |
| 8,038,013 | B2 * | 10/2011 | Chen et al. .............. 210/483 |
| 2004/0038014 | A1 | 2/2004 | Schaefer |
| 2006/0078784 | A1 | 4/2006 | Liu et al. |
| 2007/0184256 | A1 * | 8/2007 | Okada et al. ............. 428/304.4 |
| 2008/0307971 | A1 * | 12/2008 | Horie et al. .............. 95/287 |
| 2009/0065436 | A1 * | 3/2009 | Kalayci et al. ............ 210/679 |
| 2009/0255226 | A1 * | 10/2009 | Kohli et al. ............... 55/379 |
| 2010/0139224 | A1 * | 6/2010 | Lim et al. ................ 55/486 |
| 2011/0042316 | A1 * | 2/2011 | Chen et al. .............. 210/650 |
| 2012/0061332 | A1 * | 3/2012 | Kas et al. ................ 210/767 |
| 2012/0091072 | A1 * | 4/2012 | Kozlov et al. ............ 210/767 |
| 2013/0008853 | A1 * | 1/2013 | Dallas et al. ............. 210/502.1 |

FOREIGN PATENT DOCUMENTS

| | | |
|---|---|---|
| EP | 0551094 | 1/1993 |
| JP | 1078823 | 3/1989 |
| JP | 3221541 | 9/1991 |
| JP | 2006/272067 | 10/2006 |
| WO | WO 03/080905 | 10/2003 |
| WO | WO03/080905 | 10/2003 |
| WO | WO 2006/115270 | 11/2006 |
| WO | WO2006/115270 | 11/2006 |

OTHER PUBLICATIONS

U.S. Appl. No. 11/523,827, filed Sep. 20, 2006, DuPont.

* cited by examiner

LIQUID FILTRATION MEDIA

PRIORITY DATA

This application is a continuation of U.S. non-provisional Ser. No. 12/284,027, filed Sep. 18, 2008, now U.S. Pat. No. 7,993,523; which claims priority to U.S. non-provisional application Ser. No. 12/074,164, filed Feb. 29, 2008, now U.S. Pat. No. 8,038,013, which claims priority to U.S. provisional application Ser. No. 60/905,283, filed Mar. 6, 2007.

FIELD OF THE INVENTION

The present invention relates to filtration media comprising one or more layers of nanofibers in combination with one or more layers of a submicron rated membrane filter. The filtration media are especially suitable for filtering contaminants from liquids.

BACKGROUND

Membrane filters are broadly used in the area of submicron filtration. They typically offer very high filtration efficiencies, and at a specified level can become absolute. Additionally, membranes allow for significant fluid flow through their structures, enabling high per unit throughputs. One drawback of membranes when used in a direct flow through application is that they have very limited filtrate holding capacity. To compensate for this deficiency, separate prefilters can be used to extend the usable life of the membrane. These additional prefilters typically are used to separate out items which are at a larger size than the rating of the membrane, allowing the membrane to apply its limited filtrate holding capacity to the tightest size range at which the filtration operation is occurring.

Membrane laminate filter media have gained increasing recognition for their improved filtering performance. No primary cake is needed to reduce emissions to near zero levels, and nearly all the dust that is collected is removed with every shaking cycle, which helps maintain a consistently low pressure drop across the laminate throughout the life of the bag. Two layer laminates of porous expanded polytetrafluoroethylene (ePTFE) membranes and a variety of different backings have been used. A few examples are: in high temperature pulse jet applications fiberglass backings have been used, in low temperature pulse jet applications polyester felt backings have been used. Felted acrylic or felted PTFE backings have also been used in pulse jet applications where hydrolysis could be a potential problem. In low energy cleaning filtration systems (shakers and reverse air) woven polyester fabric has been used as a backing.

In order for these prefilters to approach the same general level of filtration size as the membrane, they must be processed so as to close their inherent pore size (e.g. by calendering in the case of typical nonwoven or meltblown materials). This additional processing step typically results in a reduction of the flow rate capability of the prefilter, frequently reducing it below the flow rate capability of the membrane, resulting in additional prefilters being required in parallel to accommodate the desired flow rate. Reducing the basis weight and or thickness of the prefilter to improve its flow rate results in a reduction of its filtrate holding capacity.

It would be desirable to have a microfiltration prefilter that could be directly combined with a microporous filtration membrane, that would provide a significant filtration level at the membrane target filtration level without significantly reducing the flow capability of the membrane, and significantly improving the membranes use life by removing a large percentage of the targeted filtrate size and larger items and having significant filtrate holding capacity.

SUMMARY OF THE INVENTION

In a first embodiment, the present invention is directed to a composite liquid filtration system comprising at least one nanoweb layer of polymeric nanofibers in fluid contact with a microfiltration membrane, wherein the nanoweb layer has a filtration efficiency rating of at least 10% for a particle size at which the membrane is rated with an LRV of 3.7 or greater, a thickness efficiency ratio of greater than about 0.0002, and wherein the pressure drop across the nanoweb is less than or equal to 60% of that across the composite liquid filtration medium for a given fluid flow rate, and wherein the nanoweb layer is positioned upstream of the microfiltration membrane. In further embodiments the nanoweb layer has a filtration efficiency rating of at least 30%, or 50%, or 80%, or 90% or even 95% for a particle size at which the membrane is rated with an LRV of 3.7 or greater. In still further embodiments the thickness efficiency ratio may be greater than about 0.0005, or 0.001, or 0.002, 0.003 or even 0.004.

In a still further embodiment the filter or filtration system comprises a composite liquid filtration medium comprising at least one nanoweb layer of polymeric nanofibers in fluid contact with a microfiltration membrane, wherein the nanoweb layer has;
  a mean flow pore size of less than or about five times that of the membrane,
  a bubble point pore size of less than or about 7.5 times than that of the membrane, and
  a thickness less than or equal to about twice the thickness of the membrane,
and the nanoweb layer is positioned upstream of the microfiltration membrane. The nanoweb layer can be even positioned in a separate filter body to the membrane. In a further embodiment the mean flow pore size of the nanoweb layer may be less than about three times that of the membrane while the bubble point pore size is less than about 4.5 times that of the membrane. In a still further embodiment the mean flow pore size of the nanoweb layer may be less than about twice that of the membrane while the bubble point pore size is less than about three times that of the membrane.

In other embodiments of the invention, the membrane as described in any of the embodiments above may be rated at less than 5 microns. In further embodiments the membrane is rated at less than 3 microns, 2 microns, 1.2 microns, 1 micron, 0.8 microns, 0.65 microns, 0.45 microns, 0.2 microns or even 0.1 microns.

The membrane in the invention may also be adjacent to the nanoweb, and may optionally be bonded to it over a part or all of its surface. In a further embodiment, a single membrane as described in any of the embodiments above is located in the same filter body as the nanoweb.

A further embodiment of the present invention is directed to a filter containing the composite liquid filtration medium in any embodiment as described above or claimed herein.

The invention is further directed to a method for filtering a liquid using any of the embodiments of a filter or filter media described herein.

DETAILED DESCRIPTION OF THE INVENTION

The term "nanofiber" as used herein refers to fibers having a number average diameter or cross-section less than about 1000 nm, even less than about 800 nm, even between about 50 nm and 500 nm, and even between about 100 and 400 nm. The term diameter as used herein includes the greatest cross-section of non-round shapes.

The term "nonwoven" means a web including a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials. A "nanoweb" is a nonwoven web that comprises nanofibers. The term "nanoweb" as used herein is synonymous with the term "nanofiber web."

"Calendering" is the process of passing a web through a nip between two rolls. The rolls may be in contact with each other, or there may be a fixed or variable gap between the roll surfaces. An "unpatterned" roll is one which has a smooth surface within the capability of the process used to manufacture them. There are no points or patterns to deliberately produce a pattern on the web as it passed through the nip, unlike a point bonding roll.

The term "in fluid contact with" with regard to two components of a system, one component being upstream of the other, then during the normal operation of the system, essentially all of the fluid passing through the system passes first through the upstream component and then through the other component.

The term "adjacent" in reference to the relative positions of two items such as two webs or a web and a membrane means that the items are in fluid contact with each other and are mounted in the same filter body. They may be in contact with each other, bonded to each other, or there may be a gap between them that during normal operation of the filter system would be filled with liquid or gas.

In one embodiment, the filtration system can comprise a nanofiber web with one or more nanofiber layers in fluid contact with a microporous membrane. In further embodiments, the nanoweb may have a thickness of less than about 300 μm or even less than about 150 μm as determined by ISO 534, which is hereby incorporated by reference, under an applied load of 50 kPa and an anvil surface area of 200 mm$^2$.

The nanoweb and the membrane may be adjacent to each other and may be optionally bonded to each other over part or all of their surface. The combination of nanoweb and membrane may be made by adhesively laminating the nanofiber web to the membrane or by forming the nanofiber layer directly on the membrane by placing the membrane on the collection belt in the above described process to form a membrane/nanofiber layer structure, in which case the nanofiber layer can be adhered to the membrane by mechanical entanglement. Examples of the membrane may include various microporous films such as stretched, filled polymers and expanded polytetrafluoroethylene (ePTFE) and can be used without limitation so long as the membrane has the required filtration performance.

In an embodiment of the invention, the nanofiber web and membrane are in fluid contact with other but not necessarily in physical contact with each other. They may be held in place with a gap between them, or they may be held in different filter bodies and connected by a fluid conveying channel or tube. In a further embodiment, a single membrane as described in any of the embodiments above is located in the same filter body as the nanoweb.

The as-spun nanoweb comprises primarily or exclusively nanofibers, advantageously produced by electrospinning, such as classical electrospinning or electroblowing, and also, by meltblowing or other such suitable processes. Classical electrospinning is a technique illustrated in U.S. Pat. No. 4,127,706, incorporated herein in its entirety, wherein a high voltage is applied to a polymer in solution to create nanofibers and nonwoven mats. However, total throughput in electrospinning processes is too low to be commercially viable in forming heavier basis weight webs.

The "electroblowing" process is disclosed in World Patent Publication No. WO 03/080905, incorporated herein by reference in its entirety. A stream of polymeric solution comprising a polymer and a solvent is fed from a storage tank to a series of spinning nozzles within a spinneret, to which a high voltage is applied and through which the polymeric solution is discharged. Meanwhile, compressed air that is optionally heated is issued from air nozzles disposed in the sides of, or at the periphery of the spinning nozzle. The air is directed generally downward as a blowing gas stream which envelopes and forwards the newly issued polymeric solution and aids in the formation of the fibrous web, which is collected on a grounded porous collection belt above a vacuum chamber. The electroblowing process permits formation of commercial sizes and quantities of nanowebs at basis weights in excess of about 1 gsm, even as high as about 40 gsm or greater, in a relatively short time period.

A substrate or scrim can be arranged on the collector to collect and combine the nanofiber web spun on the substrate, so that the combined fiber web is used as a high-performance filter, wiper and so on. Examples of the substrate may include various nonwoven cloths, such as meltblown nonwoven cloth, needle-punched or spunlaced nonwoven cloth, woven cloth, knitted cloth, paper, and the like, and can be used without limitations so long as a nanofiber layer can be added on the substrate. The nonwoven cloth can comprise spunbond fibers, dry-laid or wet-laid fibers, cellulose fibers, melt blown fibers, glass fibers, or blends thereof.

Polymer materials that can be used in forming the nanowebs of the invention are not particularly limited and include both addition polymer and condensation polymer materials such as, polyacetal, polyamide, polyester, polyolefins, cellulose ether and ester, polyalkylene sulfide, polyarylene oxide, polysulfone, modified polysulfone polymers, and mixtures thereof. Preferred materials that fall within these generic classes include, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a $T_g$ greater than room temperature). This is the case for polyvinylchloride and polymethylmethacrylate, polystyrene polymer compositions or alloys or low in crystallinity for polyvinylidene fluoride and polyvinylalcohol materials. One preferred class of polyamide condensation polymers are nylon materials, such as nylon-6, nylon-6,6, nylon 6,6-6,10, and the like. When the polymer nanowebs of the invention are formed by meltblowing, any thermoplastic polymer capable of being meltblown into nanofibers can be used, including polyolefins, such as polyethylene, polypropylene and polybutylene, polyesters such as poly(ethylene terephthalate) and polyamides, such as the nylon polymers listed above.

It can be advantageous to add known-in-the-art plasticizers to the various polymers described above, in order to reduce the $T_g$ of the fiber polymer. Suitable plasticizers will depend upon the polymer to be electrospun or electroblown, as well as upon the particular end use into which the nanoweb will be introduced. For example, nylon polymers can be plasticized with water or even residual solvent remaining from the electrospinning or electroblowing process. Other known-in-the-art plasticizers which can be useful in lowering polymer $T_g$ include, but are not limited to aliphatic glycols, aromatic sulphanomides, phthalate esters, including but not limited to those selected from the group consisting of dibutyl phthalate, dihexl phthalate, dicyclohexyl phthalate, dioctyl phthalate, diisodecyl phthalate, diundecyl phthalate, didodecanyl phthalate, and diphenyl phthalate, and the like. The *Handbook of Plasticizers*, edited by George Wypych, 2004 Chemtec Publishing, incorporated herein by reference, discloses other polymer/plasticizer combinations which can be used in the present invention.

Various suitable filter designs are shown in the following U.S. Pat. Nos. 4,720,292, 5,082,476, 5,104,537, 5,613,992, 5,820,646, 5,853,442, 5,954,849, and Design Pat. No. 425, 189.

The as-spun nanoweb of the present invention can be calendered in order to impart the desired physical properties to the fabric of the invention, as disclosed in co-pending U.S. patent application Ser. No. 11/523,827, filed Sep. 20, 2006 and incorporated herein by reference in its entirety. The as-spun nanoweb can be fed into the nip between two unpatterned rolls in which one roll is an unpatterned soft roll and one roll is an unpatterned hard roll, and the temperature of the hard roll is maintained at a temperature that is between the $T_g$, herein defined as the temperature at which the polymer undergoes a transition from glassy to rubbery state, and the $T_{om}$, herein defined as the temperature of the onset of melting of the polymer, such that the nanofibers of the nanoweb are at a plasticized state when passing through the calendar nip. The composition and hardness of the rolls can be varied to yield the desired end use properties of the fabric. One roll can be a hard metal, such as stainless steel, and the other a soft-metal or polymer-coated roll or a composite roll having a hardness less than Rockwell B 70. The residence time of the web in the nip between the two rolls is controlled by the line speed of the web, preferably between about 1 m/min and about 50 m/min, and the footprint between the two rolls is the MD distance that the web travels in contact with both rolls simultaneously. The footprint is controlled by the pressure exerted at the nip between the two rolls and is measured generally in force per linear CD dimension of roll, and is preferably between about 1 mm and about 30 mm.

Further, the nonwoven web can be stretched, optionally while being heated to a temperature that is between the $T_g$ and the lowest $T_{om}$ of the nanofiber polymer. The stretching can take place either before and/or after the web is fed to the calender rolls and in either or both the machine direction or cross direction.

The average fiber diameter of the nanofibers deposited by the electroblowing process and suitable for use in the invention is less than about 1000 nm, or even less than about 800 nm, or even between about 50 nm to about 500 nm, and even between about 100 nm to about 400 nm. Each nanofiber layer has a basis weight of at least about 1 g/m$^2$, even between about 6 g/m$^2$ to about 100 g/m$^2$, and even between about 6 g/m$^2$ to about 60 g/m$^2$, and a thickness between about 20 μm to about 500 μm, and even between about 20 μm to about 300 μm.

The microporous filtration membrane can be an ePTFE, or any other kind of microporous membrane known to one skilled in the art. The ePTFE can be sintered or unsintered in the membrane used in the invention. The membrane is characterized by a log reduction value (LRV) for a given size of filtered particle is given by:

$$LRV = -\log_{10}(1 - FFE),$$

where FFE is the fractional filtration efficiency which is the fraction of particles of a given size in a fluid flowing through the membrane and that are stopped by the membrane. The "rating" of a membrane is a number in microns that is assigned to a membrane and represents the approximate minimum size of particles in microns for which the LRV is greater than or equal to 3.7. By "approximate" herein is meant +/−20% of the actual particle size at which the LRV is 3.7.

In one embodiment, the nanoweb layer has a filtration efficiency rating of at least 10% for a particle size at which the membrane is rated with an LRV of 3.7 or greater, a thickness efficiency ratio of greater than about 0.0015, and wherein the pressure drop across the nanoweb is less than or equal to 60% of that across the composite liquid filtration medium for a given fluid flow rate, and wherein the nanoweb layer is positioned upstream of the microfiltration membrane. In further embodiments the nanoweb layer has a filtration efficiency rating of at least 10%, 30%, 50%, 80%, 90% or even 95% for a particle size at which the membrane is rated with an LRV of 3.7 or greater. In still further embodiments the thickness efficiency ratio may be greater than about 0.0002, or 0.0005, or 0.001, or 0.002, or 0.003 or even 0.004.

In other embodiments of the invention, the membrane may be rated at less than 5 microns. In further embodiments the membrane is rated at less than 3 microns, 2 microns, 1.2 microns, 1 micron, 0.8 microns, 0.65 microns, 0.45 microns, 0.2 microns or even less than 0.1 microns.

In a still further embodiment of the invention the nanoweb layer has a mean flow pore size of less than or about five times that of the membrane, a bubble point pore size of less than or about 7.5 times than that of the membrane, and a thickness less than or equal to about twice the thickness of the membrane, and the nanoweb layer is positioned upstream of the microfiltration membrane.

In a further embodiment the mean flow pore size of the nanoweb layer may be less than about three times that of the membrane while the bubble point pore size is less than about 4.5 times that of the membrane. In a still further embodiment the mean flow pore size of the nanoweb layer may be less than about twice that of the membrane while the bubble point pore size is less than about three times that of the membrane.

The membrane may comprise, for example, a polymer selected from the group consisting of expanded polytetrafluoroethylene, polysulfone, polyethersulfone, polyvinylidene fluoride, polycarbonate, polyamide, polyacrylonitrile, polyethylene, polypropylene, polyester, cellulose acetate, cellulose nitrate, mixed cellulose ester, and blends and combinations thereof.

An ePTFE membrane suitable for the invention can be prepared by a number of different known processes, but is preferably prepared by expanding polytetrafluoroethylene as described in U.S. Pat. Nos. 4,187,390; 4,110,239; and 3,953, 566 to obtain ePTFE, all of which are incorporated herein by reference. By "porous" is meant that the membrane has an air permeability of at least 0.05 cubic meters per minute per square meter (m/min) at 20 mm water gauge. Membranes with air permeabilities of 200 m/min at 20 mm water or more can be used. The pores are micropores formed between the nodes and fibrils of the ePTFE.

Similarly a membrane can be used that is described in any of U.S. Pat. Nos. 5,234,751, 5,217,666, 5,098,625, 5,225, 131, 5,167,890, 4,104,394, 5,234,739, 4,596,837, JPA 1078823 and JPA 3-221541 in which extruded or shaped PTFE which is unexpanded is heated to sinter or semi-sinter the article. This sintered or semi-sintered article is then stretched to form a desired porosity and desired properties.

For special applications, PTFE can be provided with a filler material in order to modify the properties of PTFE for special applications. For example, it is known from U.S. Pat. No. 4,949,284 that a ceramic filter (SiO$_2$) and a limited amount of microglass fibers can be incorporated in a PTFE material; and in EP-B-0-463106, titanium dioxide, glass fibers, carbon black, activated carbon and the like are mentioned as filler.

Techniques for the preparation of microporous films from highly filled polymers, usually polyolefins, are known. Such webs are also suitable for use as the membrane of the invention. Typically a combination of a polyolefin, usually a polyethylene, is compounded with a filler, usually CaCO$_3$, and extruded and stretched into a film to form a microporous film.

Suitable examples of microporous films for use as the filtration membrane of the present invention include those described in U.S. Pat. Nos. 4,472,328, 4,350,655 and 4,777,073 all of which are incorporated herein by reference.

The microporous membrane and nanoweb can be left in an unbonded state, or even held in different filter bodies. The microporous membrane and nanoweb can also be optionally bonded to each other, such as by adhesive bonding, thermal bonding, and ultrasonic bonding, although any means for bonding known to one skilled in the art may be employed. In a preferred embodiment, the membrane is bonded to the nanoweb, for example, using a suitable lamination technique, such as passing the materials through a hot roll nip at a temperature sufficient to melt adhesive that has been applied to the membrane or nanoweb. One of the rolls can have a raised pattern on its surface in order to produce a bonding pattern in the laminate.

One or more adhesives may optionally be used to bond the nanoweb and microporous membrane or the laminate to the inner or outer fabrics. One suitable adhesive is a thermoplastic adhesive, which can be softened upon heating, then hardened upon cooling over a number of heating and cooling cycles. An example of such a thermoplastic adhesive would be a "hot melt" adhesive.

The adhesive used to laminate the porous ePTFE membrane to the fabric can also be one of a variety of fluorochemical dispersions or synthetic latexes, including aqueous anionic dispersions of butadiene acrylonitrile copolymers, copolymers based on acrylic esters, vinyl and vinylidene chloride polymers and copolymers produced by emulsion polymerization, styrene-butadiene copolymers, and terpolymers of butadiene, styrene, and vinyl pyridine.

Different methods of coating the nanoweb or membrane with adhesive before lamination can be used. For example the nanoweb can be first coated in the required areas with adhesive and then the ePTFE membrane is placed onto the adhesive side of the coated fabric. Conductive heat and ample pressure are applied to the membrane side to cause the adhesive to flow into the membrane pores. If the adhesive is cross-linkable, the adhesive cross-links due to the heat and results in a mechanical attachment of the membrane to the substrate.

As a further example of an article formed from a laminate of a fluoropolymer and a non fluorinated polymer and a process of lamination, U.S. Pat. No. 5,855,977 discloses a multi-layer article comprising a substantially non-fluorinated layer and a fluorinated layer of fluoropolymer comprising interpolymerized monomeric units. The multi-layer article further comprises an aliphatic di-, or polyamine, the aliphatic di-, or polyamine providing increased adhesion between the layers as compared to a multi-layer article not containing the aliphatic di-, or polyamine.

A variety of further methods can be used to increase the adhesion between a fluorinated polymer layer and a polyamide. An adhesive layer can, for example, be added between the two polymer layers. U.S. Pat. No. 5,047,287 discloses a diaphragm, suitable for use in automotive applications, which comprises a base fabric having a fluororubber layer bonded to at least one surface by an adhesive that includes an acrylonitrile-butadiene or acrylonitrile-isoprene rubber having an amino group.

Surface treatment of one or both of the layers also sometimes is employed to aid bonding. Some, for example, have taught treating fluoropolymer layers with charged gaseous atmosphere (e.g., corona treatment) and subsequently applying a layer of a second material, for example a thermoplastic polyamide. E.g., European Patent Applications 0185590 (Ueno et al.) and 0551094 (Krause et al.) and U.S. Pat. No. 4,933,060 (Prohaska et al.) and U.S. Pat. No. 5,170,011 (Martucci).

Blends of the fluoropolymer and the dissimilar layer themselves are in some cases employed as an intermediate layer to help bond the two layers together. European Patent Application 0523644 (Kawashima et al.) discloses a plastic laminate having a polyamide resin surface layer and a fluororesin surface layer.

In a further example of a method of bonding a non fluoropolymer layer to a fluoropolymer layer, U.S. Pat. No. 6,869,682 describes an article comprising: a) a first layer comprising fluoropolymer; and b) a second layer bonded to the first layer, the second layer comprising a mixture of a melt processable substantially non-fluorinated polymer, a base, and a crown ether.

In a still further example of a method of bonding a non fluoropolymer layer to a fluoropolymer layer U.S. Pat. No. 6,962,754 describes a structure comprising a fluoropolymer layer and directly attached to one of its sides a tie layer comprising a tie resin comprising a polyamide which results from the condensation of monomers comprising essentially at least one di-acid and at least one diamine of a specific composition.

The heat and pressure of the method by which the layers are brought together (e.g., coextrusion or lamination) may be sufficient to provide adequate adhesion between the layers. However, it may be desirable to further treat the resulting multi-layer article, for example with additional heat, pressure, or both, to provide further adhesive bond strength between the layers. One way of supplying additional heat when the multi-layer article prepared by extrusion is by delaying the cooling of the laminate after co-extrusion. Alternatively, additional heat energy may be added to the multi-layer article by laminating or coextruding the layers at a temperature higher than necessary for merely processing the several components. Or, as another alternative, the finished laminate may be held at an elevated temperature for an extended period of time. For example the finished multi-layer article may be placed in a separate means for elevating the temperature of the article, such as an oven or heated liquid bath. A combination of these methods may also be used.

The filter of the invention may comprise a scrim layer in which the scrim is located adjacent to only the nanoweb, or only the membrane, or in between both. A "scrim", as used here, is a support layer and can be any planar structure with which the nanoweb can be bonded, adhered or laminated. Advantageously, the scrim layers useful in the present invention are spunbond nonwoven layers, but can be made from carded webs of nonwoven fibers and the like. Scrim layers useful for some filter applications require sufficient stiffness to hold pleats and dead folds. The invention is further directed to a method for filtering particles from a liquid comprising the steps of passing the liquid through a filter system as described in any of the embodiments above. For example the liquid could be passed through a nanoweb layer, followed by a membrane layer in fluid contact with the nanoweb layer, in which the nanoweb layer has a filtration efficiency rating of at least 10%, or 30%, or 50%, or 80%, or 90% or even 95% for a particle size at which the membrane is rated with an LRV of 3.7 or greater, and a thickness efficiency ratio of greater than about 0.0002, and wherein the pressure drop across the nanoweb is less than or equal to 60% of that across the composite liquid filtration medium for a given fluid flow rate, and the nanoweb layer is positioned upstream of the microfiltration membrane.

In a further embodiment the method therefore comprises passing liquid through a composite liquid filtration system comprising at least one nanoweb layer of polymeric nanofibers in fluid contact with a microfiltration membrane, wherein the nanoweb layer has a mean flow pore size of less than or about five times that of the membrane, a bubble point pore size of less than or about 7.5 times than that of the membrane, and a thickness less than or equal to about twice the thickness of the membrane, and the nanoweb layer is positioned upstream of the microfiltration membrane.

The nanoweb layer can be even positioned in a separate filter body to the membrane. In a further embodiment the mean flow pore size of the nanoweb layer may be less than about three times that of the membrane while the bubble point pore size is less than about 4.5 times that of the membrane. In a still further embodiment the mean flow pore size of the nanoweb layer may be less than about twice that of the membrane while the bubble point pore size is less than about three times that of the membrane.

In other embodiments of the method of the invention, the membrane as described in any of the embodiments above may be rated at less than 5 microns. In further embodiments the membrane is rated at less than 3 microns, 2 microns, 1.2 microns, 1 micron, 0.8 microns, 0.65 microns, 0.45 microns, 0.2 microns or even 0.1 microns.

The membrane in the method of the invention may also be adjacent to the nanoweb, and may optionally be bonded to it over a part or all of its surface.

EXAMPLES

In the following examples web thickness was determined by ISO 534, which is hereby incorporated by reference, under an applied load of 50 kPa and an anvil surface area of 200 mm². The thickness is reported in mils and converted to micrometers.

Specific Water Flow Rate (also referred to as Flux) is the volumetric flow rate at which fluid passes through the sample of a given area and was measured by passing deionized water through filter medium samples having a diameter of 2.217 cm. The water was forced through the samples using hydraulic pressure (water head pressure) or pneumatic pressure (air pressure over water). The test uses a fluid filled column containing a magnetic float, and a sensor attached to the column reads the position of the magnetic float and provides digital information to a computer. Flow rate is calculated using data analysis software supplied by PMI.

Fractional Filtration Efficiency (FFE) was measured according to ASTM Designation F795-88 (withdrawn in 2002). "Standard Practice for Determining the Performance of a Filter Medium Employing a Single-Pass, Constant-Rate, Liquid Test". Fractional filtration efficiency is determined by passing particle suspension in deionized water through the sample of a given area and measuring the percentage of particles that are separately from the liquid. Particles involved can be latex beads (polystyrene), ISO dust or silica spheres. Particle suspension can be monodispersed single particle, mixture of monodispersed particles or polydispersed particles. The percentage of particles that are separated from the liquid is determined by measuring the number of particles in the suspension before passing through medium and after passing through the medium upstream. The number of particles in suspension is determined by using an optical particle counter (instrument: MC-100 SN M1029).

Log reduction value (LRV) for a given size of filtered particle is given by:

$$LRV = -\log_{10}(1-FFE).$$

The thickness efficiency ratio (TER) of a web is then given by:

$$LRV/(\text{web thickness in } \mu m).$$

Example 1

A 24% solution of polyamide-6,6 in formic acid was spun by electroblowing as described in WO 03/080905. The number average fiber diameter for Example 1 was about 270 nm.

Example 2

A 24% solution of polyamide-6,6 in formic acid was spun by electroblowing as described in WO 03/080905. The number average fiber diameter for Example 2 was about 420 nm.

The as-spun nanofiber sheets of Examples 1 and 2 were calendered by delivering the nanofiber sheets to a two roll calender nip from an unwind. A device for spreading the sheet prior to the nip was used to maintain a flat, wrinkle free sheet upon entering the nip. The hard roll was a 9.76 inch (24.79 cm) diameter steel roll, and the soft roll was a nylon-surfaced roll having a Shore D hardness of about 85, and about 10.5 inches (26.67 cm) in diameter. Both examples were calendered with the steel roll heated to 125° C. and at line speed of 20 ft/min. Nip pressure is 1000 psi and 300 psi for example 1 and 2, respectively.

Comparative Example 1

Comparative Example 1 was a 130 gsm meltblown polypropylene filter material obtained from Pall Corporation.

Table 1 shows the thicknesses, LRV (0.5) values and TER values for the three samples.

TABLE 1

| Sample | Thickness µm | LRV (0.5 µm particle) | TER µm⁻¹ |
|---|---|---|---|
| Example 1 | 47 | 1.98 | 0.042 |
| Example 2 | 83 | 1.45 | 0.017 |
| C.E. 1 | 252 | 1.66 | 0.0066 |

Table 2 shows the water permeability at different pressures for the three samples.

TABLE 2

| Sample | 2 psi | 5 psi | 10 psi | 15 psi | 20 psi |
|---|---|---|---|---|---|
| Example 1 | 0.0074 | 0.0137 | 0.0226 | 0.0297 | 0.0361 |
| Example 2 | 0.0131 | 0.0261 | 0.0441 | 0.0600 | 0.0723 |
| C.E. 1 | 0.0066 | 0.0142 | 0.0226 | 0.0270 | 0.0302 |

Table 3 shows filtration efficiencies at larger particle sizes than the reference 0.5 μm demonstrates that example 2, which has significantly higher water permeability than either example 1 or comparative example 1, yields comparable filtration efficiencies to comparative example 1 at higher particle size than 0.5 μm.

TABLE 3

| Sample | 0.59 μm | 0.80 μm | 0.99 μm |
|---|---|---|---|
| Example 1 | 99.37% | 99.41% | 99.32% |
| Example 2 | 99.80% | 99.81% | 99.57% |
| C.E. 1 | 99.61% | 99.64% | 99.63% |

Typically in a filtration application the filtrate will contain a distribution of particle sizes. The nanoweb example 2 is therefore superior to the comparative sample as a prefilter medium in that it is able to more efficiently pre screen the particles impinging on a membrane attached thereto at higher permeability. If the membrane were rated for 0.45 μm to have a typical LRV of 3.7, the lifetime of the membrane in the application would be expected to be extended and the fluid flow resistance of the combined system reduced.

We claim:

1. A filter system for filtering particles from liquid comprising at least one nanoweb layer of polymeric nanofibers upstream of, and in fluid contact with, a microfiltration membrane, wherein the nanoweb layer has a filtration efficiency rating of at least 10% to 30% for a particle size at which the membrane is rated with an LRV of 3.7 or greater, and a thickness efficiency ratio of greater than about 0.0002, and wherein the pressure drop across the nanoweb is less than or equal to 60% of that across the filter system for a given fluid flow rate.

2. The filter system of claim 1 in which the microfiltration membrane is rated at less than 5 microns.

3. The filter system of claim 2 in which the microfiltration membrane is rated at less than 2 microns.

4. The filter system of claim 3 in which the microfiltration membrane is rated at less than 1.2 microns.

5. The filter system of claim 1 in which the nanoweb layer a thickness efficiency ratio of greater than about 0.001.

6. The filter system of claim 1 in which the membrane comprises a polymeric material selected from the group consisting of expanded polytetrafluoroethylene, polysulfone, polyethersulfone, polyvinylidene fluoride, polycarbonate, polyimide, polyacrylonitrile, polyethylene, polypropylene, polyester, cellulose acetate, cellulose nitrate, mixed cellulose ester, and blends and combinations thereof.

7. The filter system of claim 1 in which the nanoweb has a thickness of less than about 300 μm.

8. The filter system of claim 1 in which the nanoweb has a thickness of less than about 150 μm.

9. The filter system of claim 1 in which the nanoweb and the membrane are adjacent to each other.

10. The filter system of claim 9 in which the nanoweb and the membrane are bonded over at least a fraction of their surfaces.

11. The filter system of claim 10 in which the membrane and the nanoweb are bonded by a means selected from the group consisting of thermal lamination, point bonding, ultrasonic bonding, and adhesive bonding.

12. A filter system for filtering particles from liquid comprising at least one nanoweb layer of polymeric nanofibers upstream of, and in fluid contact with, a microfiltration membrane, wherein the nanoweb layer has;
   a mean flow pore size of less than or about five times that of the membrane,
   a bubble point pore size of less than or about 7.5 times than that of the membrane, and
   a thickness less than or equal to about twice the thickness of the membrane wherein the nanoweb layer has a filtration efficiency rating of 10%-30%.

13. The filter system of claim 12 in which the microfiltration membrane is rated at less than 5 microns.

14. The filter system of claim 13 in which the microfiltration membrane is rated at less than 2 microns.

15. The filter system of claim 14 in which the microfiltration membrane is rated at less than 1.2 microns.

16. The filter system of claim 12 in which the nanoweb layer has;
   a mean flow pore size of less than or about three times that of the membrane, and
   a bubble point pore size of less than or about 4.5 times than that of the membrane.

17. The filter system of claim 12 in which the nanoweb layer has;
   a mean flow pore size of less than or about two times that of the membrane, and
   a bubble point pore size of less than or about three times than that of the membrane.

18. The filter system of claim 12 in which the membrane comprises a polymeric material selected from the group consisting of expanded polytetrafluoroethylene, polysulfone, polyethersulfone, polyvinylidene fluoride, polycarbonate, polyamide, polyacrylonitrile, polyethylene, polypropylene, polyester, cellulose acetate, cellulose nitrate, mixed cellulose ester, and blends and combinations thereof.

19. The filter system of claim 12 in which the nanoweb has a thickness of less than about 300 μm.

20. The filter system of claim 12 in which the nanoweb has a thickness of less than about 150 μm.

21. The filter system of claim 12 in which the nanoweb and the membrane are adjacent to each other.

22. The filter system of claim 21 in which the nanoweb and the membrane are bonded over at least a fraction of their surfaces.

23. The filter system of claim 22 in which the membrane and the nanoweb are bonded by a means selected from the group consisting of thermal lamination, point bonding, ultrasonic bonding, and adhesive bonding.

24. A method for filtering particles from a liquid comprising the steps of passing the liquid through a nanoweb layer, followed by a membrane layer in fluid contact with the nanoweb layer, in which the nanoweb layer has a filtration efficiency rating of at least 10% for a particle size at which the membrane is rated with an LRV of 3.7 or greater, and a thickness efficiency ratio of greater than about 0.0002, and wherein the pressure drop across the nanoweb is less than or equal to 60% of that across the composite liquid filtration medium for a given fluid flow rate, and the nanoweb layer is positioned upstream of the microfiltration membrane wherein the nanoweb layer has a filtration efficiency rating of 10%-30%.

25. The method of claim 24 in which the nanoweb layer and the membrane layer are adjacent to each other.

26. A method for filtering particles from a liquid comprising the steps of passing the liquid through a nanoweb layer, followed by a membrane layer, wherein the nanoweb layer has;
   a mean flow pore size of less than or about fives times that of the membrane, a bubble point pore size of less than or about 7.5 times than that of the membrane, and a thickness less than or equal to about twice the thickness of the membrane, and the nanoweb layer is positioned upstream of the microfiltration membrane wherein the nanoweb layer has a filtration efficiency rating of 10%-30%.

27. The method of claim 26 in which the nanoweb layer and the membrane layer are adjacent to each other.

* * * * *